(12) United States Patent
Bologna et al.

(10) Patent No.: US 9,917,347 B2
(45) Date of Patent: Mar. 13, 2018

(54) HINGE BARREL ANTENNA SYSTEM

(71) Applicant: Dell Products L.P., Round Rock, TX (US)

(72) Inventors: Benny Bologna, Austin, TX (US); Anthony Sanchez, Pflugerville, TX (US); Priyank Gajiwala, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/924,477

(22) Filed: Oct. 27, 2015

(65) Prior Publication Data

US 2017/0117608 A1 Apr. 27, 2017

(51) Int. Cl.
| | | |
|---|---|---|
| *H01Q 1/24* | (2006.01) | |
| *H01Q 1/22* | (2006.01) | |
| *G06F 1/16* | (2006.01) | |
| *H01Q 1/08* | (2006.01) | |
| *H01Q 13/10* | (2006.01) | |
| *H01Q 21/30* | (2006.01) | |

(52) U.S. Cl.
CPC ......... *H01Q 1/2266* (2013.01); *G06F 1/1618* (2013.01); *H01Q 1/084* (2013.01); *H01Q 13/10* (2013.01); *H01Q 21/30* (2013.01)

(58) Field of Classification Search
CPC ............... H01Q 1/24; H01Q 1/22; H01Q 9/42
USPC ........................................................ 343/702
See application file for complete search history.

(56) References Cited

U.S. PATENT DOCUMENTS

| | | | | |
|---|---|---|---|---|
| 8,264,412 | B2 * | 9/2012 | Ayala | H01Q 1/2266 343/700 MS |
| 8,373,610 | B2 | 2/2013 | Chiang et al. | |
| 9,203,137 | B1 * | 12/2015 | Guterman | H01Q 1/2266 |
| 2003/0234743 | A1 * | 12/2003 | Ponce De Leon | H01Q 1/243 343/702 |
| 2007/0115185 | A1 * | 5/2007 | Ying | H01Q 1/243 343/702 |
| 2008/0231522 | A1 * | 9/2008 | Montgomery | H01Q 13/10 343/702 |
| 2009/0149231 | A1 * | 6/2009 | Sato | H01Q 1/243 455/575.7 |
| 2009/0262029 | A1 * | 10/2009 | Chiang | H01Q 1/2266 343/702 |
| 2010/0009728 | A1 * | 1/2010 | Koshi | H01Q 1/243 455/575.3 |
| 2010/0321255 | A1 * | 12/2010 | Kough | H01Q 1/2266 343/702 |

(Continued)

FOREIGN PATENT DOCUMENTS

EP 1858112 A1 11/2007

*Primary Examiner* — Huedung Mancuso
(74) *Attorney, Agent, or Firm* — Haynes and Boone, LLP

(57) ABSTRACT

A hinge barrel antenna system includes a first hinge device and a second hinge device that couple a chassis base to a display device. A hinge barrel extends between the first hinge device and the second hinge device. A hinge barrel support member is included in the hinge barrel and defines a first slot that extends through the hinge barrel support member. A feed structure is coupled to the hinge barrel support member adjacent the first slot by a circuit board. The first slot is dimensioned such that the combination of the first slot and the feed structure emit radio waves having a first predetermined frequency when the feed structure is activated.

20 Claims, 19 Drawing Sheets

(56) References Cited

U.S. PATENT DOCUMENTS

| | | | |
|---|---|---|---|
| 2012/0068893 A1* | 3/2012 | Guterman | H01Q 1/2266 |
| | | | 343/702 |
| 2013/0321216 A1 | 12/2013 | Jervis et al. | |
| 2014/0240177 A1* | 8/2014 | Wang | H01Q 1/2266 |
| | | | 343/702 |
| 2015/0011273 A1* | 1/2015 | Wilmhoff | H01Q 1/243 |
| | | | 455/575.7 |
| 2017/0117611 A1* | 4/2017 | Lepe | H01Q 1/24 |

\* cited by examiner

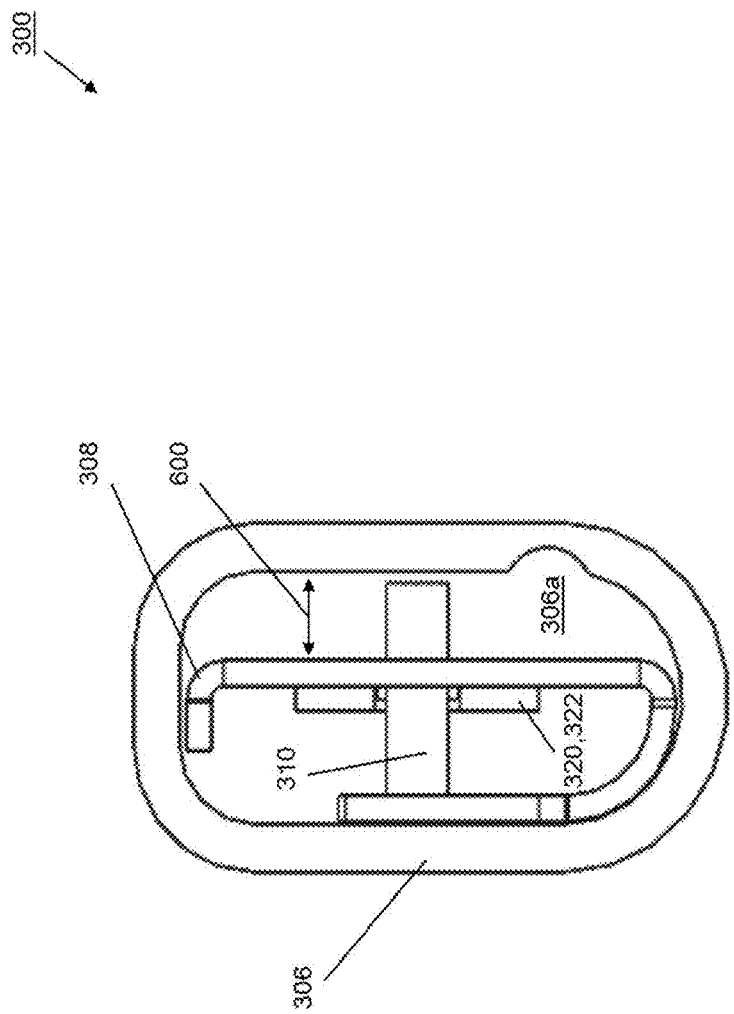

HINGE BARREL ANTENNA SYSTEM

BACKGROUND

The present disclosure relates generally to information handling systems, and more particularly to an antenna system provided in a hinge barrel of an information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, mobile computing devices, utilize antenna systems for wireless communications. In many such mobile computing devices, the antenna system may be positioned in a bezel on the display chassis to reduce the chances of chassis base and other structural features from interfering with the antenna system. However, it has become desirable to reduce the size (i.e., the thickness) of the bezel on display chassis, which has begun to limit the ability to position antenna systems in bezels. Furthermore, it has also become desirable to provide metal surfaces on mobile computing devices for aesthetic reasons, and such surfaces do not provide the metal clearances necessary to prevent interference with antenna systems. Further still, some mobile computing devices such as convertible laptop/notebook/tablet computing systems may have the ability to have their chassis modified from a laptop/notebook configuration to a tablet configuration, which can result in ground plane changes that can cause antenna system interference, and/or cause the chassis base or other structural features that did not interfere with the antenna system when the computing system was in the laptop/notebook orientation being moved such that they interfere with the antenna system when the computing system is in the tablet orientation. One solution to this is to move the antenna system from the display chassis to the chassis base or the hinge that moveably couples the display chassis to the chassis base. However, both the chassis base and the hinge include several metal components that cause degraded antenna system performance similar to that discussed above.

Accordingly, it would be desirable to provide an improved antenna system.

SUMMARY

According to one embodiment, an information handling system (IHS) includes a chassis base that houses a wireless communication engine; a display device that is coupled to the chassis base by a first hinge device; a hinge support member that extends from the first hinge device; a first slot that is defined in the hinge support member and that extends through the hinge support member; and a feed structure that is coupled to the wireless communication engine and positioned adjacent the first slot, wherein the first slot is dimensioned such that the combination of the first slot and the feed structure emit radio waves having a first predetermined frequency when the feed structure is activated by the wireless communication engine.

BRIEF DESCRIPTION OF THE DRAWINGS

FIG. 2b is a schematic view illustrating an embodiment of the computing device of FIG. 2a.

FIG. 3b is a perspective view illustrating an embodiment of a hinge barrel cover and a hinge barrel support member in the hinge barrel of FIG. 3a.

FIG. 6a is a cross sectional view illustrating the hinge barrel support member and feed structures housed in the hinge barrel cover of FIGS. 3b and 3d.

FIG. 8a is a perspective, cutaway view illustrating an embodiment of the orientation of the hinge barrel support member and antenna system slots on the computing device in the first orientation of FIG. 2a.

FIG. 8b is a graph illustrating an embodiment of the return loss in the antenna system of the computing device in the first orientation of FIG. 8a.

FIG. 9b is a graph illustrating an embodiment of the return loss in the antenna system of the computing device in the second orientation of FIG. 9a.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
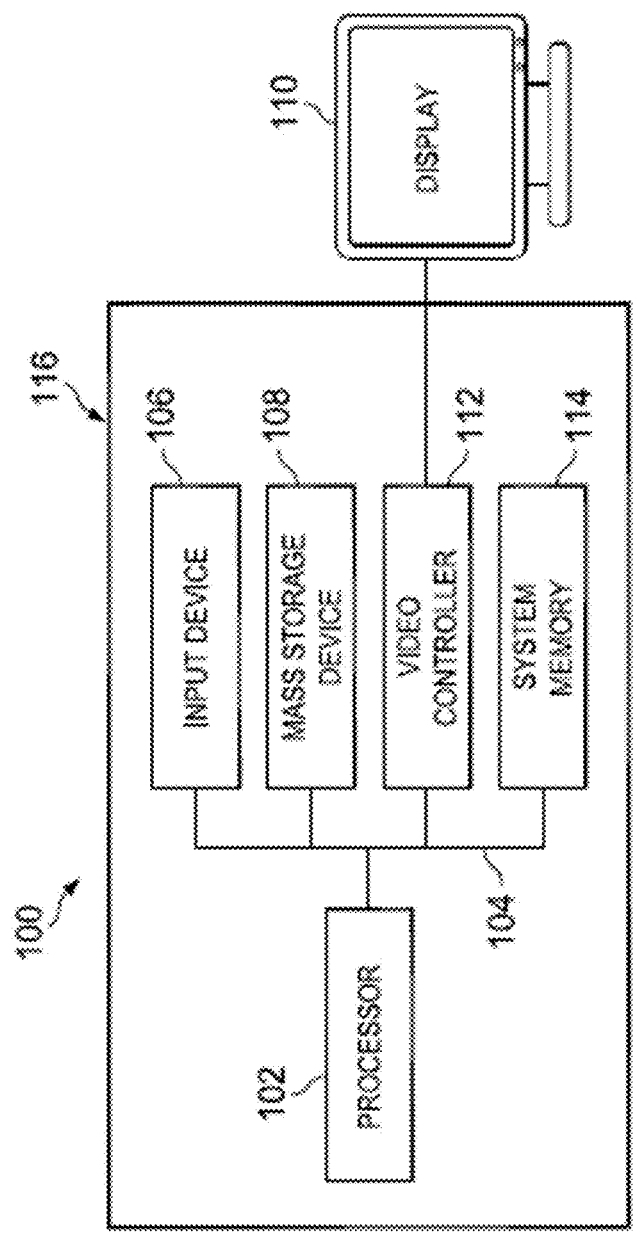
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
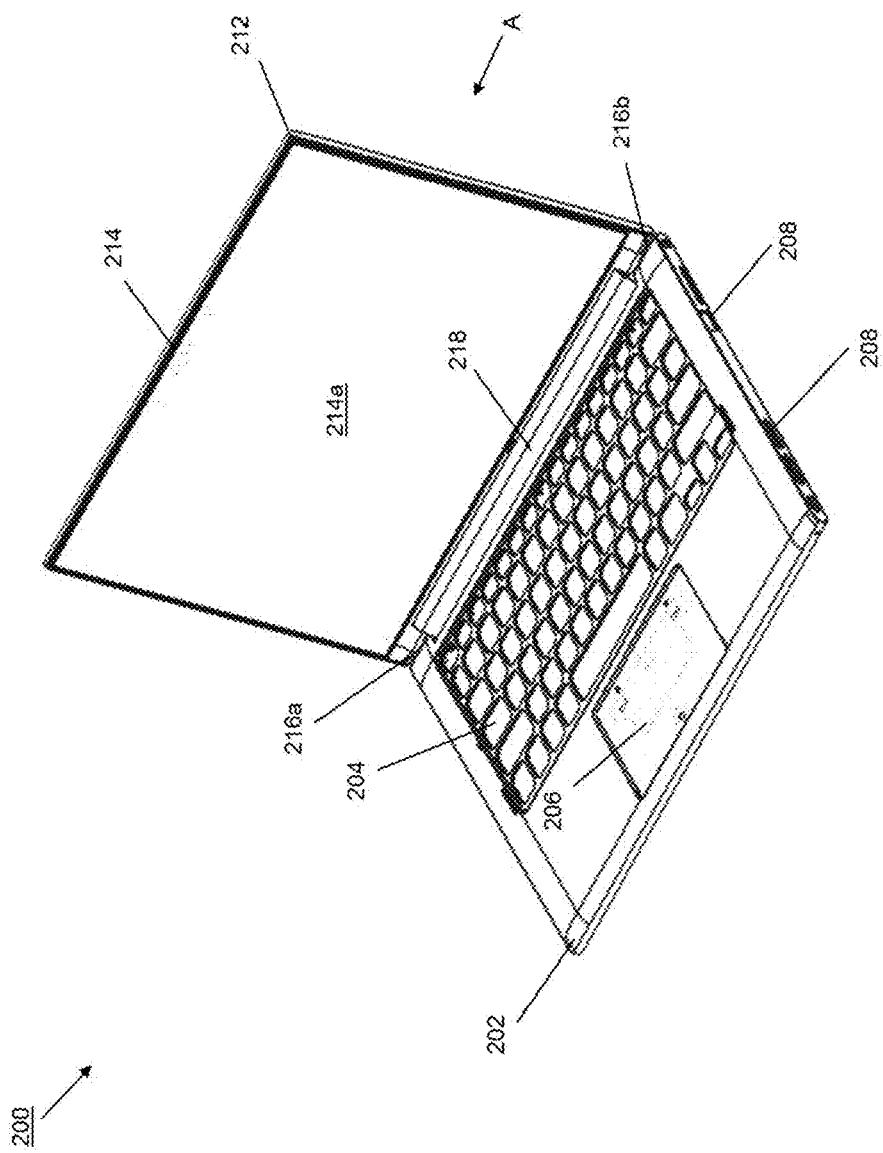
FIG. 2a is a perspective view illustrating an embodiment of a computing device in a first orientation.
Figure 2B:
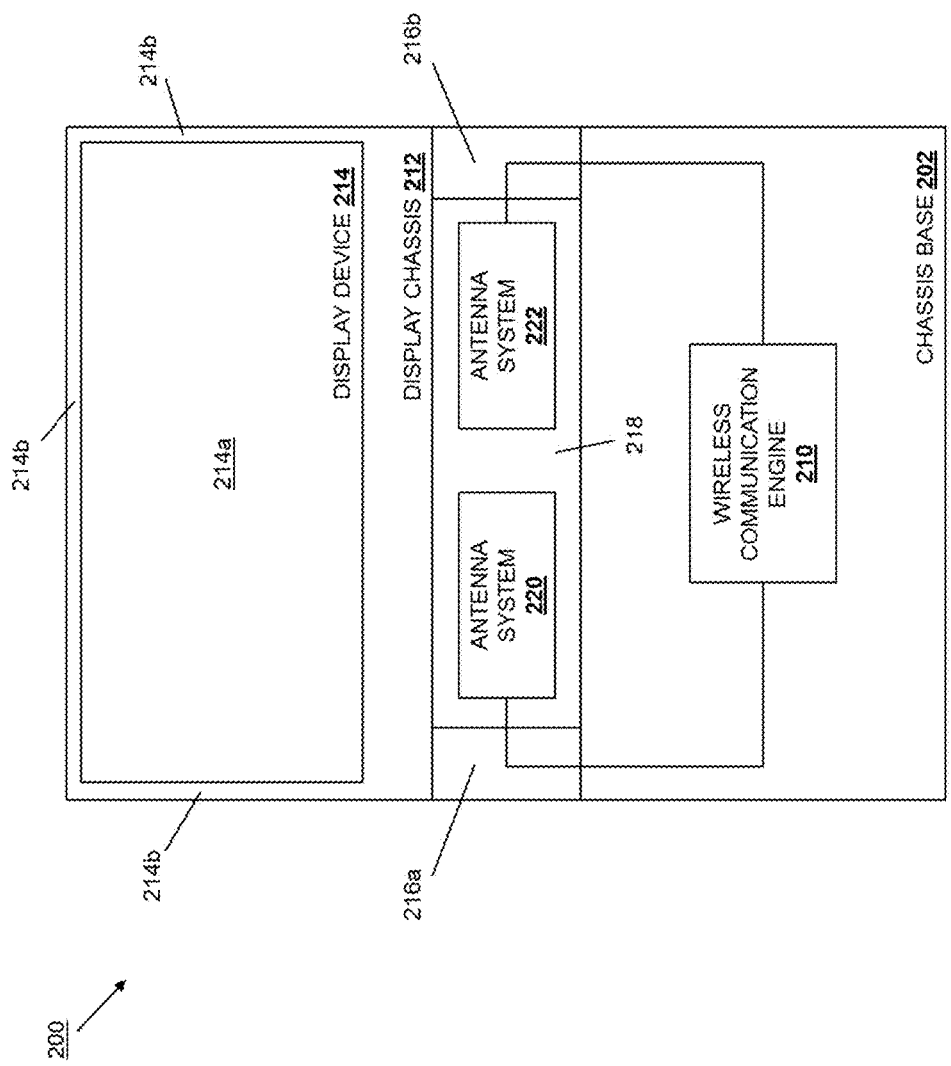
Figure 2C:
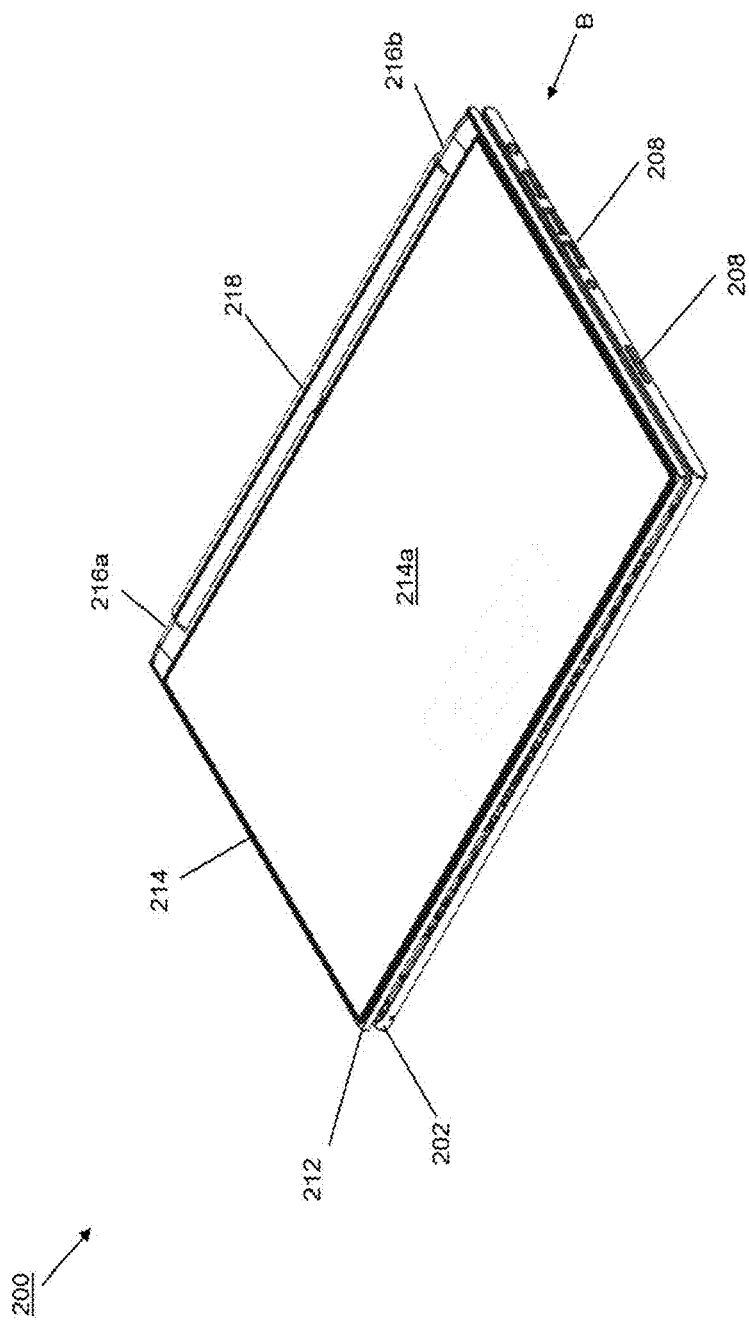
FIG. 2c is a perspective view illustrating an embodiment of the computing device of FIG. 2a in a second orientation.

Referring now to FIGS. 2a, 2b, and 2c, an embodiment of a computing device 200 that may utilize the hinge barrel antenna system of the present disclosure is illustrated. In an embodiment, the computing device 200 may be the IHS 100 discussed above with reference to FIG. 1 and/or may include some or all of the components of the IHS 100. In the embodiments illustrated and discussed below, the computing device 200 is a convertible laptop/notebook/tablet computing device. However, one of skill in the art in possession of the present disclosure will recognize that the teachings of the present disclosure may benefit other types of computing devices and thus the application of the teachings herein to such devices is envisioned as falling within the scope of the present disclosure. The computing device 200 includes a chassis base 202 that provides a plurality of input subsystems including a keyboard 204 and a touch pad 206, as well as a plurality of connectors 208 (e.g., data connectors, networking connectors, peripheral device connectors, etc.) that are accessible on an outer surface of the chassis base 202. The chassis base 202 may house a variety of computing device components, only some of which are illustrated in FIG. 2b. For example, the chassis base 202 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide a wireless communication engine 210 that is configured to perform the functions of the wireless communication engines and computing systems discussed below. In addition, the wireless communication engine 210 may include any of a variety of components for enabling any of a variety of wireless communication technologies such as, for example, wireless local area network (WLAN) communication technologies, wireless wide area network (WWAN) communication technologies, BLUETOOTH® communication technologies, and/or other wireless communication technologies known in the art. One of skill in the art will recognize that the chassis base 202 may house and/or provide a variety of other computing devices components that have not been illustrated for clarity but that will fall within the scope of the present disclosure.

The computing device 200 also includes a display chassis 212 that houses a display device 214 including a screen 214a, and a bezel 214b is defined on the display chassis 212 between the edges of the screen 214a on the display device 214 and the edges of the display chassis 212. While not illustrated, one of skill in the art in possession of the present disclosure will recognize that the display device 214 in the display chassis 212 may be coupled to processing and/or other computing device components in order to allow the display device 214 to display information on the display screen 214a. In the illustrated embodiment, the chassis base 202 is moveably coupled to the display chassis 212 through a hinge barrel antenna system that, in the illustrated embodiment, includes a plurality of hinge devices 216a and 216b may each be mounted to common edges of the chassis base 202 and the display chassis 212 in a spaced apart orientation from each other using techniques known in the art. A hinge barrel 218, which is discussed in further detail below, is also included in the hinge barrel antenna system and extends between the hinge devices 216a and 216b. The hinge barrel 218 houses a plurality of antenna systems 220 and 222 that are coupled to the wireless communication engine 210 (e.g., via a coupling between the antenna systems 220 and 222 and the processing system). While a pair of hinge devices 216a and 216b are included on the hinge barrel antenna system of the computing device 200 in the illustrated embodiment, one of skill in the art in possession of the present disclosure will recognize that fewer or more hinge devices may be provided on the hinge barrel antenna system of the computing device while remaining within the scope of the present disclosure.

FIG. 2a illustrates the computing system 200 in a first (laptop/notebook) orientation A in which the screen 214a on the display device 214 in the display chassis 212 may be oriented relative to the chassis base 202 at angles between approximately 90 degrees and 135 degrees (although other angles will fall within the scope of the present disclosure) in response to the rotation of the display chassis 212 about the hinge devices 216a and 216b. FIG. 2c illustrates the computing system 200 in a second (tablet) orientation B in which the screen 214a on the display device 214 in the display chassis 212 is oriented substantially parallel to the chassis base 202 in response to the rotation of the display chassis 212 about the hinge devices 216a and 216b approximately 360 degrees such that the screen 214a of the display device 214 is accessible and visible. As discussed above, conventional antenna systems included in computing devices similar to the computing device illustrated in FIGS. 2a-2c have typically been provided in the bezel of the display chassis 212, and it has been found that while such antenna placement is sufficient for wireless communications when those computing systems are in a laptop/notebook orientation, wireless communications can substantially degrade when those computing systems are in a tablet orientation (e.g., due to ground plane changes, interference from the chassis base that becomes located immediately adjacent those antenna systems as illustrated in FIG. 2c, etc.) However, as discussed below, the provisioning of the antenna systems 220 in the hinge barrel 218 in the manner discussed below operates to remedy such issues, as neither of the chassis base 202 or the display chassis 212 is positioned immediately adjacent those antennas systems 220 and 222 in either of the laptop/notebook orientation A or the tablet orientation B. While two antenna systems are illustrated and described as being located in the hinge barrel, fewer or more antenna systems are envisioned as falling within the scope of the present disclosure.

Figure 3A:
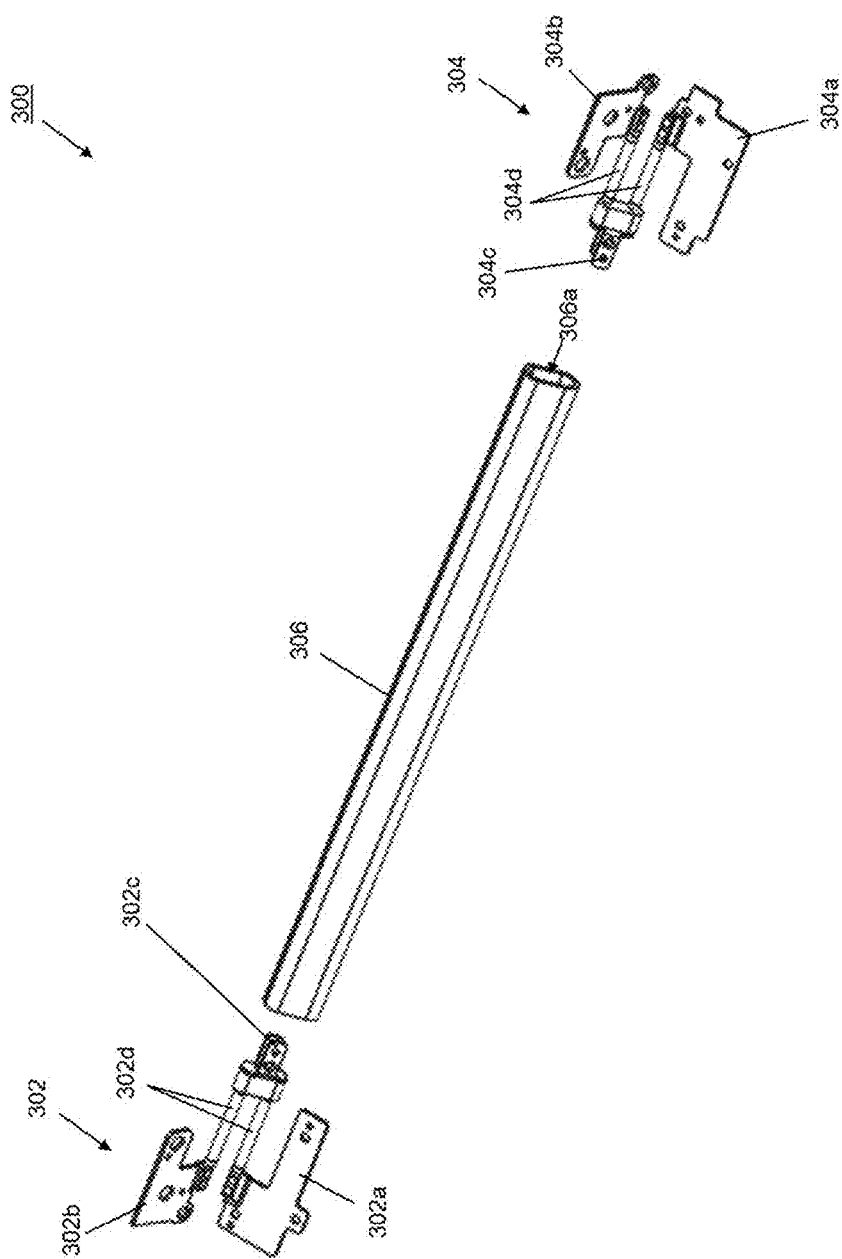
FIG. 3a is an exploded perspective view illustrating an embodiment of a hinge barrel and hinge brackets used in the computing system of FIGS. 2a and 2b.

Referring now to FIGS. 3a, 3b, 3c, 3d, and 3e, an embodiment of a hinge barrel antenna system 300 is illustrated that may provide the hinge barrel antenna system discussed above with reference to FIGS. 2a, 2b, and 2c. Referring first to FIG. 3a, the hinge barrel antenna system 300 includes a pair of hinge devices 302 and 304 which may be the hinge devices 216a and 216b discussed above with reference to FIG. 2. The hinge device 302 includes a chassis base coupling bracket 302a that may be used to mount the hinge device 302 to the chassis base 202, a display chassis coupling bracket 302b that may be used to mount the hinge device 302 to the display chassis 212, and a support member coupling bracket 302c that is coupled to each of the chassis base coupling bracket 302a and the display chassis coupling bracket 302b by conduits 302d. Similarly, the hinge device 304 includes a chassis base coupling bracket 304a that may be used to mount the hinge device 304 to the chassis base 202, a display chassis coupling bracket 304b that may be used to mount the hinge device 304 to the display chassis 212, and a support member coupling bracket 304c that is coupled to each of the chassis base coupling bracket 304a and the display chassis coupling bracket 304b by conduits 304d. A hinge barrel cover 306, which may provide a portion of the hinge barrel 218 discussed above with reference to FIG. 2, defines a hinge barrel cover housing 306a along its length that, as discussed below, may house the support member coupling brackets 302c and 304c. In an embodiment, the hinge barrel cover 306 may be provided using a plastic material, other non-metallic RF-permeable materials (e.g., having a dielectric constant less than approximately 4.0 and a loss tangent less than approximately 0.01), and/or a variety of other materials known in the art that provide for relatively low interference with wireless signals from the antenna systems discussed below.

Figure 3B:
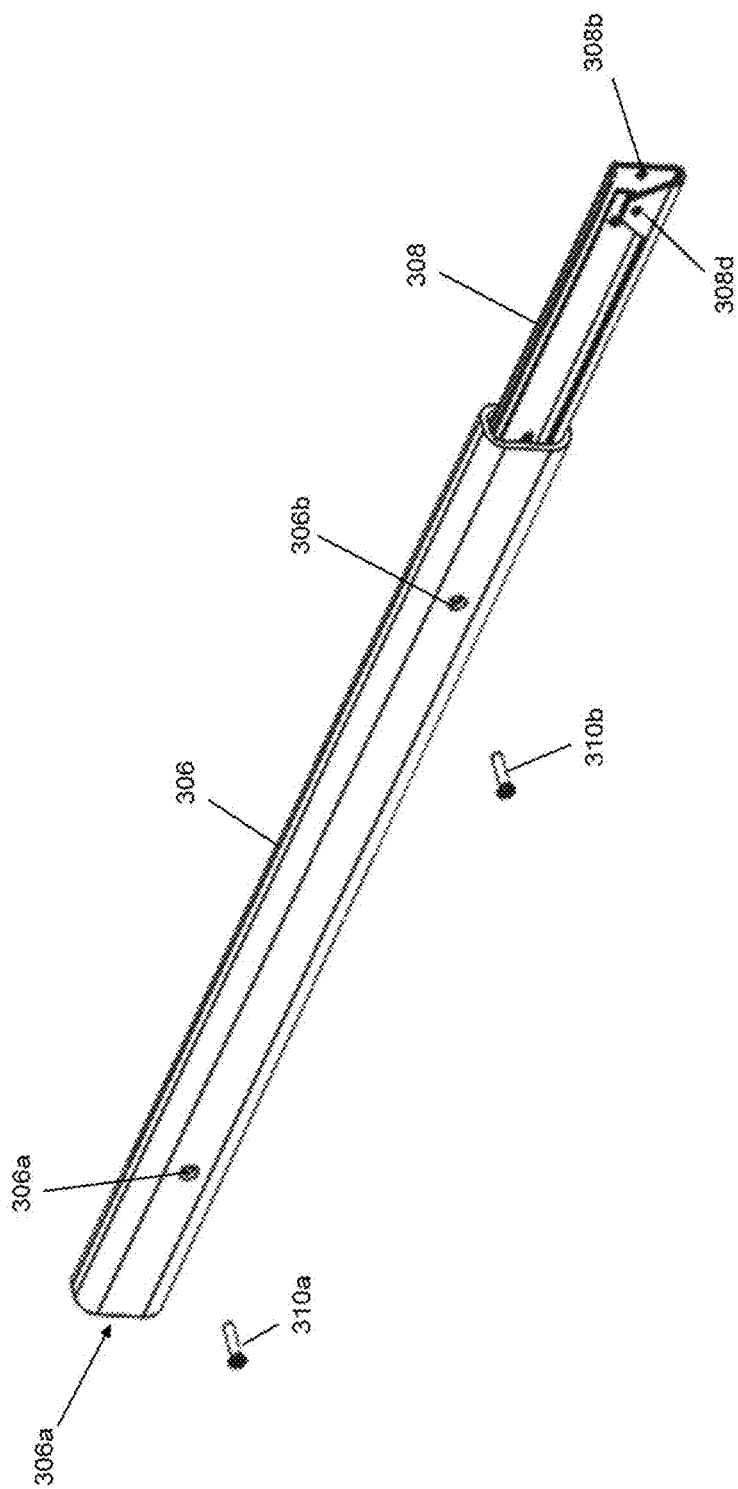

Referring now to FIGS. 3b, 3c, 3d, and 3e, an embodiment of the components of the hinge barrel included in the hinge barrel antenna system 300 are illustrated. The hinge barrel may include a hinge barrel support member 308. In an embodiment, the hinge barrel support member 308 may include a metal material (e.g., the hinge barrel support member 308 may be fabricated from sheet metal), steel, aluminum, other conductive materials that can provide the strength requirements of the hinge barrel, and/or a variety of other materials known in the art that when utilized as the hinge barrel support member 308 result in a fortified structure that provides mechanical strength to the hinge barrel/moveably coupling between the chassis base 202 and the display chassis 212, while also operating to provide a portion of the antenna systems as discussed in further detail below. In the illustrated embodiment, the hinge barrel support member 308 is provided with opposite ends that each include a respective bracket coupling 308a and 308b that is configured to couple to a respective one of the support member coupling brackets 302c and 304c illustrated in FIG. 3a. A plurality of hinge barrel cover coupling tabs 308c and 308d are provided adjacent the respective bracket couplings 308a and 308b and are configured to couple to the hinge barrel cover 306. For example, as illustrated in FIG. 3b, the hinge barrel cover 306 may define a plurality of cover apertures 306a and 306b that are located adjacent the hinge barrel cover coupling tabs 308c and 308d, respectively, when the hinge barrel support member 308 is housed in the hinge barrel cover housing 306a, and coupling members 310a and 310b may be positioned in the apertures 306a and 306b, respectively, and in engagement with the hinge barrel cover coupling tabs 308c and 308d, respectively, to secure the hinge barrel support member 308 to the hinge barrel cover 306. The hinge barrel support member 308 also defines a first antenna system slot 312 and a second antenna system slot 314 that extend through the hinge barrel support member 308 and that are discussed in further detail below. The hinge barrel support member 308 also defines a plurality of first feed structure coupling apertures 316a and 316b located adjacent the first antenna system slot 312, and a plurality of second feed structure coupling apertures 318a and 318b located adjacent the second antenna system slot 314.

Figure 3C:
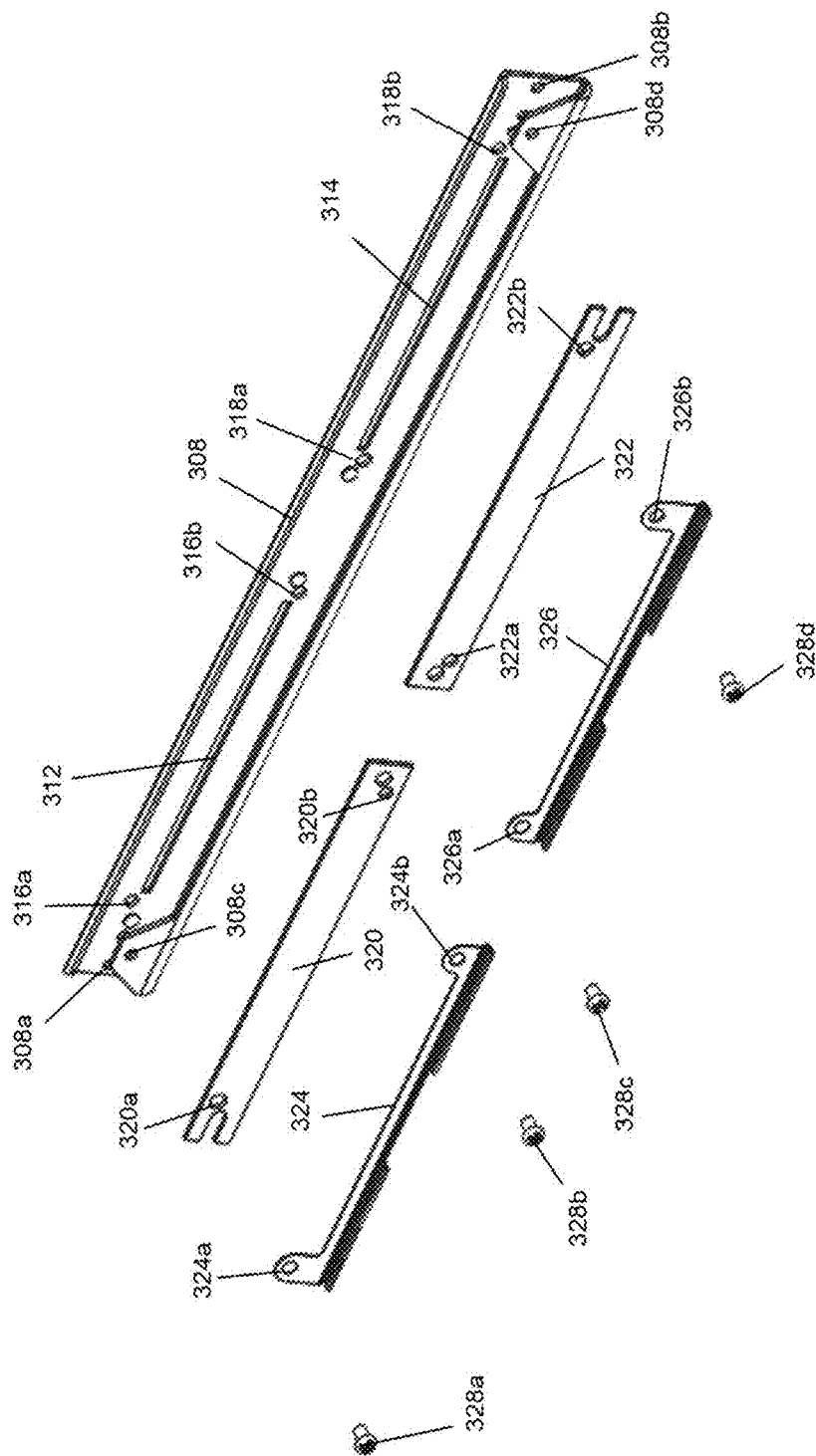
FIG. 3c is an exploded perspective view illustrating an embodiment of the coupling of feed structures to the hinge barrel support member of FIG. 3c.
Figure 3D:
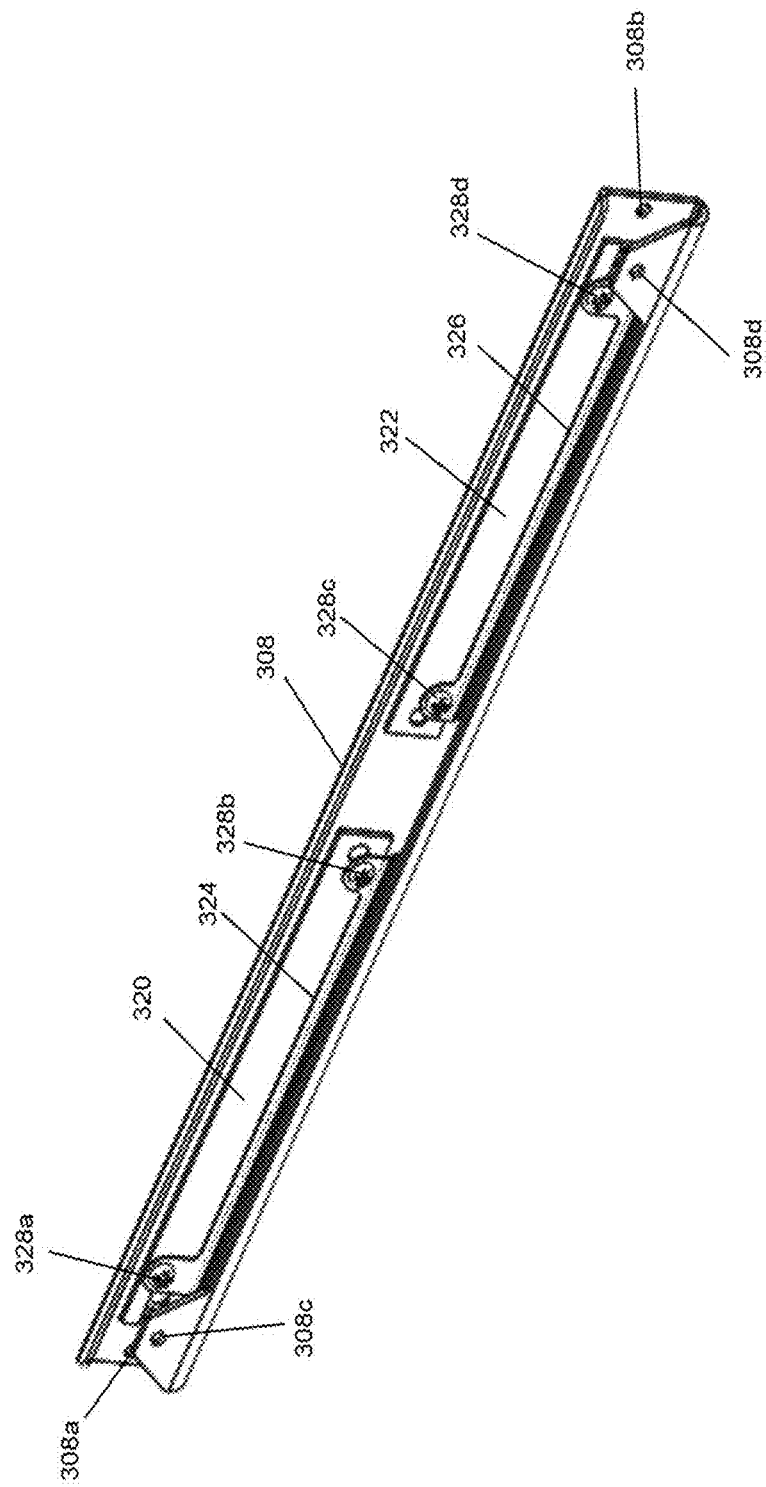
FIG. 3d is a perspective view illustrating an embodiment of feed structures coupled to the hinge barrel support member of FIG. 3b.

As illustrated in FIG. 3c, the hinge barrel includes a first feed structure 320 that defines a plurality of first feed structure apertures 320a and 320b, and a second feed structure 322 that defines a plurality of second feed structure apertures 322a and 322b. In addition, the hinge barrel includes a first feed structure bracket 324 that defines a plurality of first feed structure bracket apertures 324a and 324b, and a second feed structure bracket 326 that defines a plurality of second feed structure bracket apertures 326a and 326b. As discussed below, in some embodiments the feed structure brackets 324a and 324b may allow for proper mounting of the first feed structure 320a the second feed structure 322 to the hinge barrel support member 308, as well as to provide an antenna coaxial cable grounding mechanism. As illustrated in FIGS. 3c and 3d, the first feed structure 320 may be positioned adjacent the first antenna system slot 312 such that the first feed structure apertures 320a and 320b align with the first feed structure coupling apertures 316a and 316b, the first feed structure bracket 324 may then be positioned adjacent the first feed structure 320 such that the first feed structure bracket apertures 324a and 324b align with the first feed structure apertures 320a and 320b, and coupling members 328a and 328b may be positioned in the aligned first feed structure bracket apertures 324a and 324b, first feed structure apertures 320a and 320b, and first feed structure coupling apertures 316a and 316b to secure the first feed structure 320 to the hinge barrel support member 308.

Similarly, the second feed structure 322 may be positioned adjacent the second antenna system slot 314 such that the second feed structure apertures 322a and 322b align with the second feed structure coupling apertures 318a and 318b, the second feed structure bracket 326 may then be positioned adjacent the second feed structure 322 such that the second feed structure bracket apertures 326a and 326b align with the second feed structure apertures 322a and 322b, and coupling members 328c and 328d may be positioned in the aligned second feed structure bracket apertures 326a and 326b, second feed structure apertures 322a and 322b, and second feed structure coupling apertures 318a and 318b to secure the second feed structure 322 to the hinge barrel support member 308. With the first feed structure 320 and the second feed structure 322 secured to the hinge barrel support member 308 as illustrated in FIG. 3d, the hinge barrel support member 308 may be positioned in the hinge barrel cover housing 306a and secured to the hinge barrel cover 306 as discussed above. In some embodiments, the hinge barrel support member 308 illustrated in FIG. 3d may include a structure material (e.g., a glass-filled polycarbonate) in the channel that houses the feed structures 320 and 322 in order to enhance the strength of the hinge barrel support member 308.

Figure 3E:
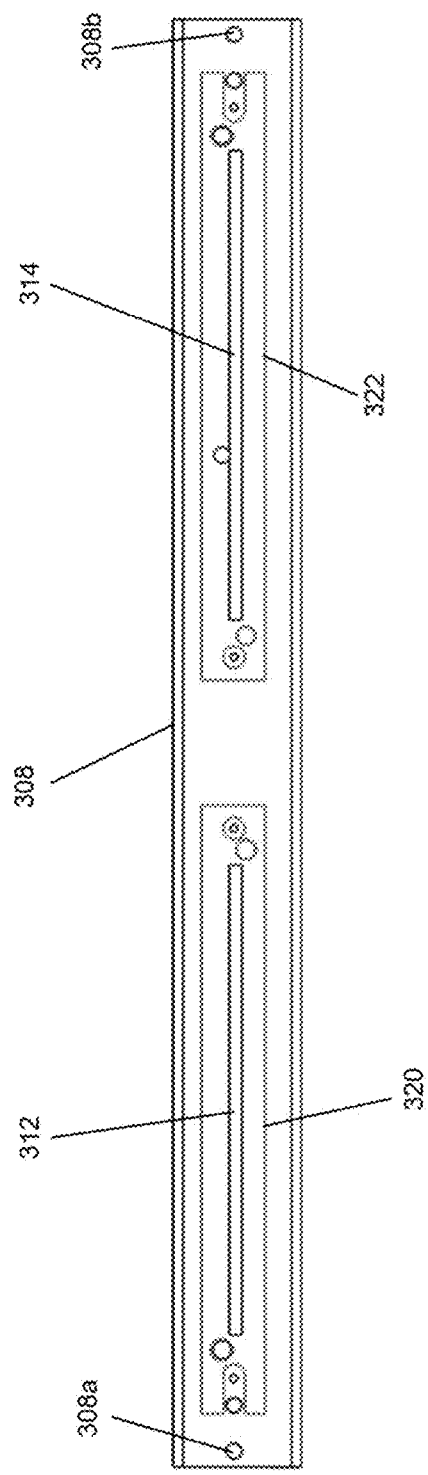
FIG. 3e is a front view illustrating an embodiment of feed structures coupled to the hinge barrel support member of FIG. 3c.

Referring now to FIG. 3e, an embodiment of the hinge barrel support member 308 with a partially transparent first feed structure 320 and second feed structure 322 is provided to illustrate the alignment of the first feed structure 320 and the second feed structure 322 with their respective adjacent first antenna system slot 312 and second antenna system slot 314. In an embodiment, each of the first feed structure 320 and the second feed structure 322 may include a circuit board having a monopole, a variety of radiation mechanisms that may be coupled with the antenna system slots to provide the desired communication frequency bands, and/or other signal generation component that may be provided on the circuit board opposite the circuit board from the adjacent antenna system slot. In an embodiment, each adjacent antenna system slot may be dimensioned or "tuned" with respect to the signal generation component on the circuit board of its corresponding feed structure such that the activation of that signal generation component will cause the combined feed structure and antenna system slot to emit radio signals in a predetermined frequency range. For example, the antenna system slot(s) may be dimensioned or "tuned" with their corresponding feed structures to emit radio signals at the 2.4 GHz range, the 5.0 GHz range, and/or any other radio frequency range desired for use with a variety of different wireless communication systems known in the art. As such, one of skill in the art in possession of the present disclosure will recognize that the dimensions of the first antenna system slot 312 and the second antenna system slot 314 may be modified based on the desired radio frequency range, the design and/or components used in the first feed structure 320 and the second feed structure 322, and/or based on any of a number of other factors known in the art. One of skill in the art in possession of the present disclosure will recognize that while the antenna system slots are illustrated as substantially rectangular, different sizes and shapes of the antenna system slots may be provided depending on the desired frequency bands, mechanical environment, and/or other factors that may affect wireless transmissions using the hinge barrel antenna system.

Figure 4:
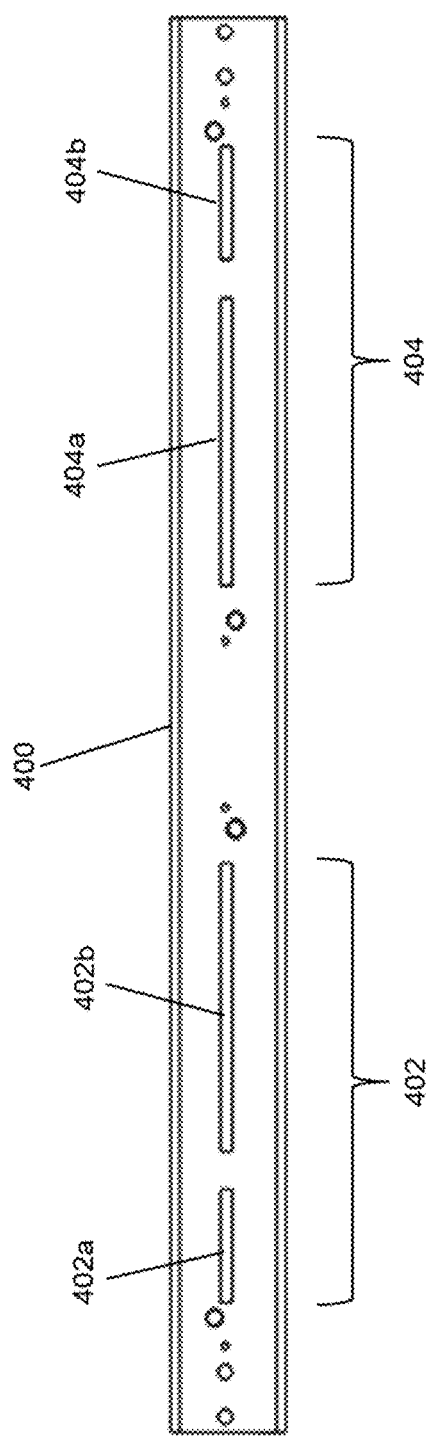
FIG. 4 is a front view illustrating an alternative embodiment of the hinge barrel support member of FIG. 3c.

Referring now to FIG. 4, an embodiment of an alternative hinge barrel support member 400 is illustrated that is substantially similar to the hinge barrel support member 308 discussed above with reference to FIGS. 3a-3e, but with the first antenna system slot 312 and the second antenna system slot 314 replaced with a plurality of first antenna system slots 402 and a plurality of second antenna system slots 404. In the illustrated embodiment, the plurality of first antenna system slots 402 include first antenna system slot 402a and second antenna system slot 402b, and the plurality of second antenna system slots 404 include second antenna system slot 404a and second antenna system slot 404b. Similarly as with the first antenna system slot 312 and the second antenna system slot 314 discussed above, the plurality of first antenna system slots 402 and the plurality of second antenna system slots 404 may be "tuned" with respect to the signal generation component on the circuit board of its corresponding feed structure such that the activation of that signal generation component will cause the combined feed structure and antenna system slots to emit radio signals in a predetermined frequency range. For example, the first antenna system slot 402a and the second antenna system slot 404a may be "tuned" to emit radio signals in the 2.4 GHz range, and the first antenna system slot 402b and the second antenna system slot 404b may be "tuned" to emit radio signals in the 5.0 GHz range. One of skill in the art in possession of the present disclosure will recognize that while the antenna system slots are illustrated as substantially rectangular, different sizes and shapes of the antenna system slots may be provided depending on the desired frequency bands, mechanical environment, and/or other factors that may affect wireless transmissions using the hinge barrel antenna system.

Figure 5:
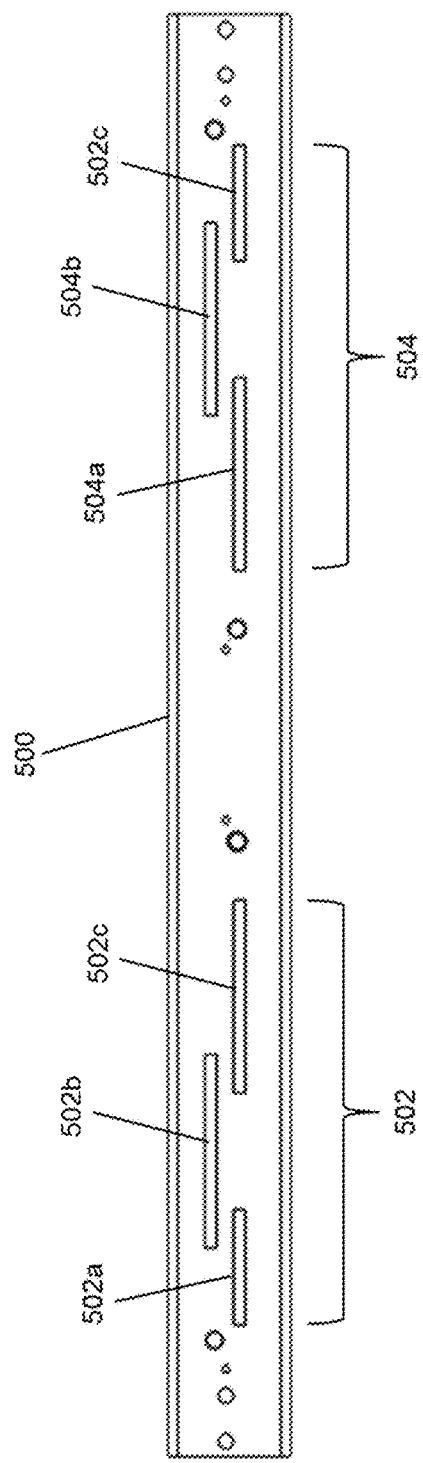
FIG. 5 is a front view illustrating an alternative embodiment of the hinge barrel support members of FIG. 3c and FIG. 4.

Referring now to FIG. 5, an embodiment of an alternative hinge barrel support member 500 is illustrated that is substantially similar to the hinge barrel support members 308 and 400 discussed above with reference to FIGS. 3a-3e and 4, but with the first antenna system slot 312/plurality of first antenna system slots 402 and the second antenna system slot 314/plurality of second antenna system slots 404 replaced with a plurality of first antenna system slots 502 and a plurality of second antenna system slots 504. In the illustrated embodiment, the plurality of first antenna system slots 502 include first antenna system slot 502a, first antenna system slot 502b, and first antenna system slot 502c; and the plurality of second antenna system slots 504 include second antenna system slot 504a, second antenna system slot 504b, and second antenna system slot 504c. Similarly as discussed above, the plurality of first antenna system slots 502 and the plurality of second antenna system slots 504 may be "tuned" with respect to the signal generation component on the circuit board of its corresponding feed structure such that the activation of that signal generation component will cause the combined feed structure and antenna system slots to emit radio signals in three predetermined frequency ranges. One of skill in the art in possession of the present disclosure will recognize that any number of antenna system slots may be dimensions or tunes to emit signals in predetermined frequency ranges while remaining within the scope of the present disclosure. One of skill in the art in possession of the present disclosure will recognize that while the antenna system slots are illustrated as substantially rectangular, different sizes and shapes of the antenna system slots may be provided depending on the desired frequency bands, mechanical environment, and/or other factors that may affect wireless transmissions using the hinge barrel antenna system.

Figure 6B:
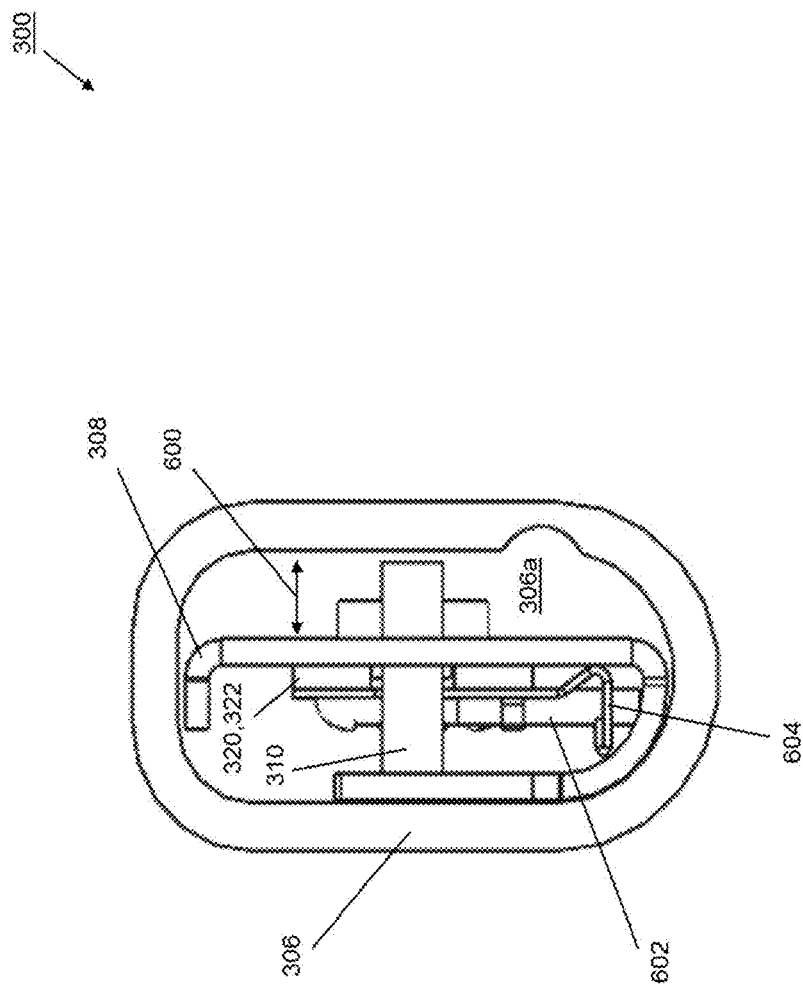
FIG. 6b is a cross sectional view illustrating the hinge barrel support member and feed structures housed in the hinge barrel cover of FIGS. 3b and 3d, with cabling and grounding elements.

Referring now to FIGS. 6a and 6b, a cross-sectional view of the hinge barrel in the hinge barrel antenna system 300 of FIGS. 3a-3e is illustrated. As can be seen in FIG. 6a, the hinge barrel cover housing 306a houses the hinge barrel support member 308 (with the secured feed structures 320, 322) that is secured to the hinge barrel cover 306 by the coupling members 310. In the illustrated embodiment, a spacing 600 between the hinge barrel support member 308 and the hinge barrel cover 306 is dimensioned such that the specific absorption rate of radio frequency signals emitted from the antenna system slots is below a predetermined rate when the feed structures are activated. Furthermore, as can be seen in FIG. 3d, no portion of the hinge barrel support member 308 may extend opposite the feed structures 320 and 322 from the antenna system slots 312 and 314 in order to minimize reflections and improve the radiation pattern from the antenna system slots 312 and 314. However, if such a portion of the hinge barrel support member 308 extends opposite the feed structures 320 and 322 from the antenna system slots 312 and 314 (e.g., the hinge barrel support member 308 is a tube or otherwise encloses the feed structures 312 and 314, slots may be defined in that portion in order to minimize reflections and improve the radiation pattern from the antenna system slots 312 and 314. FIG. 6b illustrates a radio cable 602 that is housed in the hinge barrel cover 306 and coupled to the feed structures 320, 322. For example, the radio cable 602 may be an RF coaxial cable that provides at least a portion of the coupling between the wireless communication engine 210 and the antenna systems 220 and 222 illustrated in FIG. 2c, and may extend from the chassis base 202 and into the hinge barrel cover 306 through the conduits 302d in the hinges 302, 304 in the FIG. 3a. FIG. 6b also illustrates grounding bracket 604 that is housed in the hinge barrel cover 306, coupled to the feed structures 320, 322, and grounded to the hinge barrel support member 308.

Figure 7:
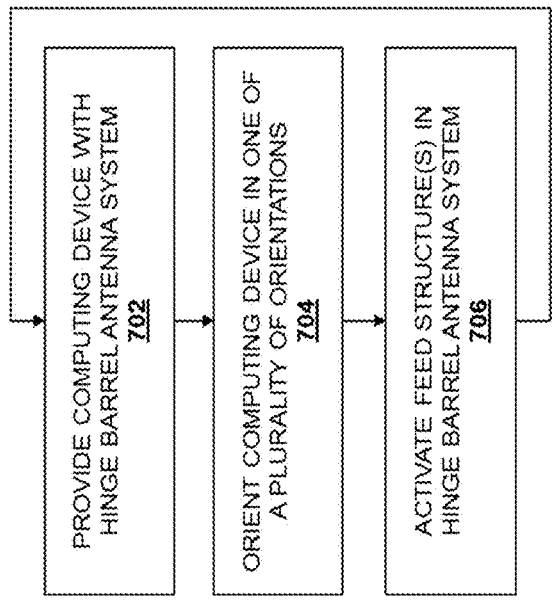
FIG. 7 is a flow chart illustrating an embodiment of a method for wireless communications.

Referring now to FIG. 7, and embodiment of a method 700 for wireless communications is illustrated. As discussed below, the hinge barrel antenna system of the present disclosure utilizes a structural portion of the hinge barrel, has been conventionally used for providing hinge rigidity, as a portion of one or more antenna systems by defining one or more "tuned" slots in that structural member and coupling feed structures to that structural member adjacent the "tuned" slot(s). When the feed structures are activated, the "tuned" slot(s) cause radio signals to be emitted in predetermined frequency ranges. As such, antenna system(s) may be provided in the hinge barrel on a multi-orientation computing device such that none of the orientations of that computing system (nor portions of the hinge) introduce interfere with wireless communications using the antenna systems.

Figure 8A:
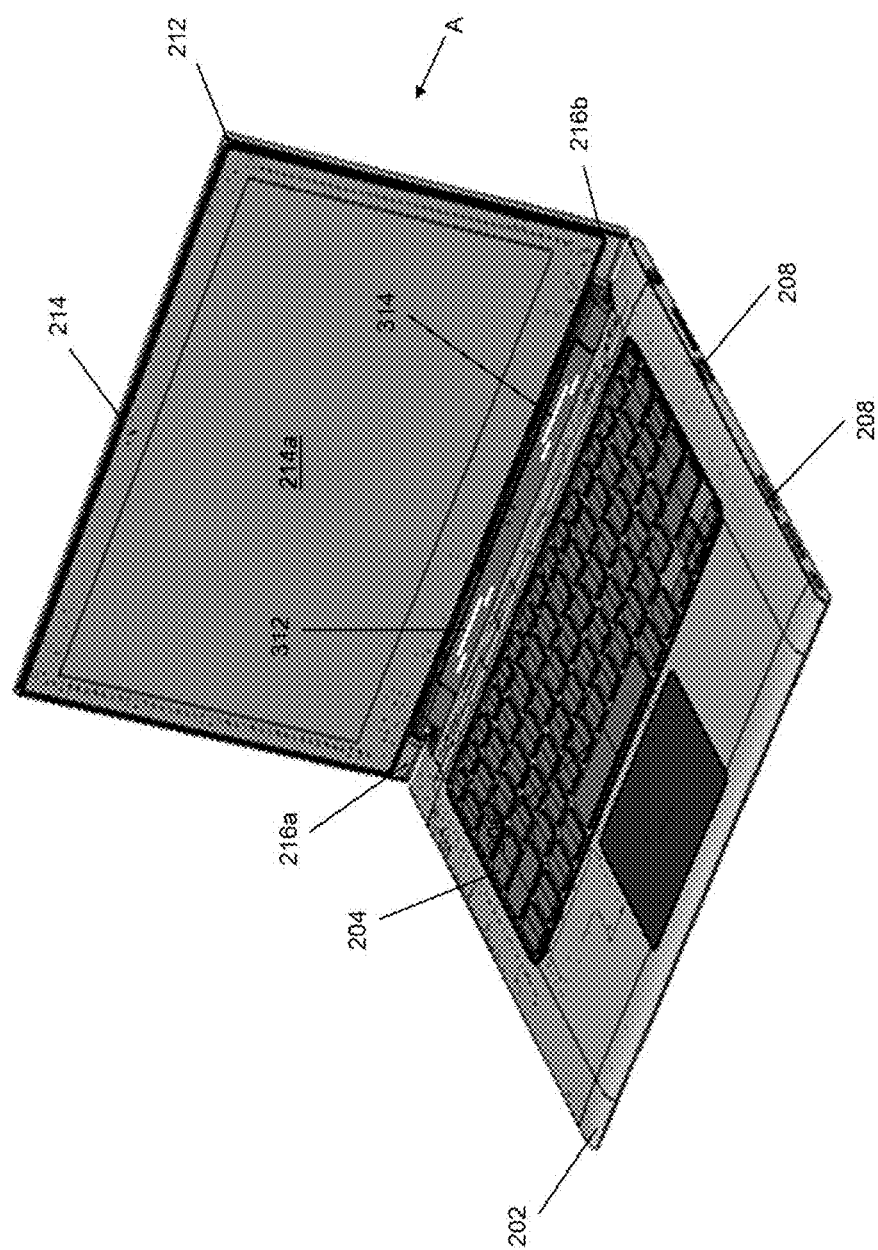
Figure 9A:
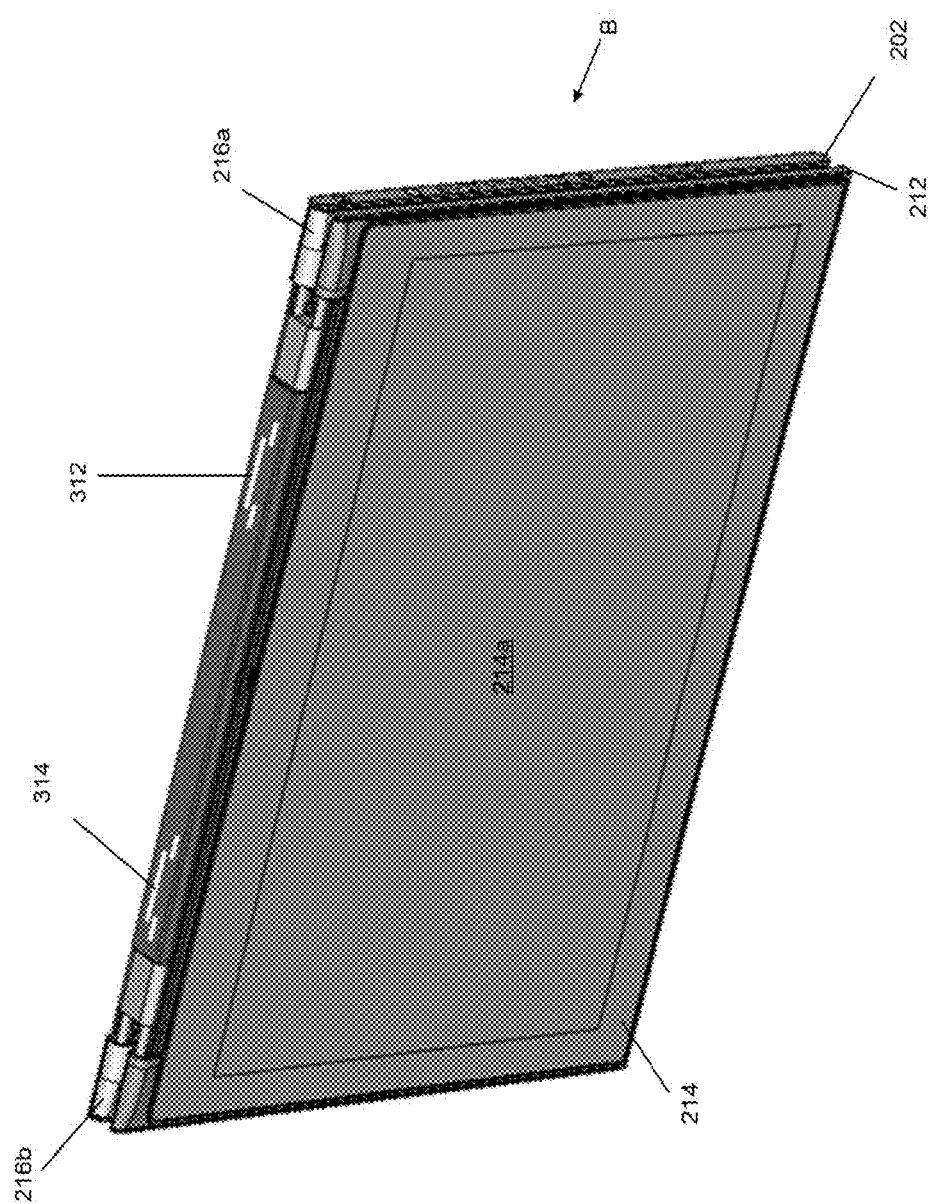
FIG. 9a is a perspective, cutaway view illustrating an embodiment of the orientation of the hinge barrel support member and antenna system slots on the computing device in the second orientation of FIG. 2c.

The method 700 begins at block 702 where a computing device with a hinge barrel antenna system is provided. In an embodiment, the computing device 200 of FIGS. 2a-2c is provided that utilizes the hinge barrel antenna system 300 of FIGS. 3a-3e having the hinge barrel with the first feed structure 320 and the second feed structure 322 coupled adjacent the first antenna system slot 312 and the second antenna system slot 314, respectively, defined by the hinge barrel support member 308. The method 700 then proceeds to block 704 where the computing device is oriented in one of a plurality of orientation. In an embodiment, the computing device 200 may be oriented in the first orientation A illustrated in FIG. 8a. FIG. 8a illustrates the computing device 200 having the hinge barrel cover 306 on the hinge barrel removed so that the antenna system slots 312 and 314 can be seen. As can be seen, in the first orientation A, neither of the chassis base 202 or the display chassis 212 are located immediately adjacent the antenna system slots 312 or 314. In an embodiment, the computing device 200 may be oriented in the second orientation B illustrated in FIG. 9a. FIG. 9a illustrates the computing device 200 having the hinge barrel cover 306 on the hinge barrel removed so that the antenna system slots 312 and 314 can be seen. As can be seen, in the second orientation B, neither of the chassis base 202 or the display chassis 212 are located immediately adjacent the antenna system slots 312 or 314.

Figure 8B:
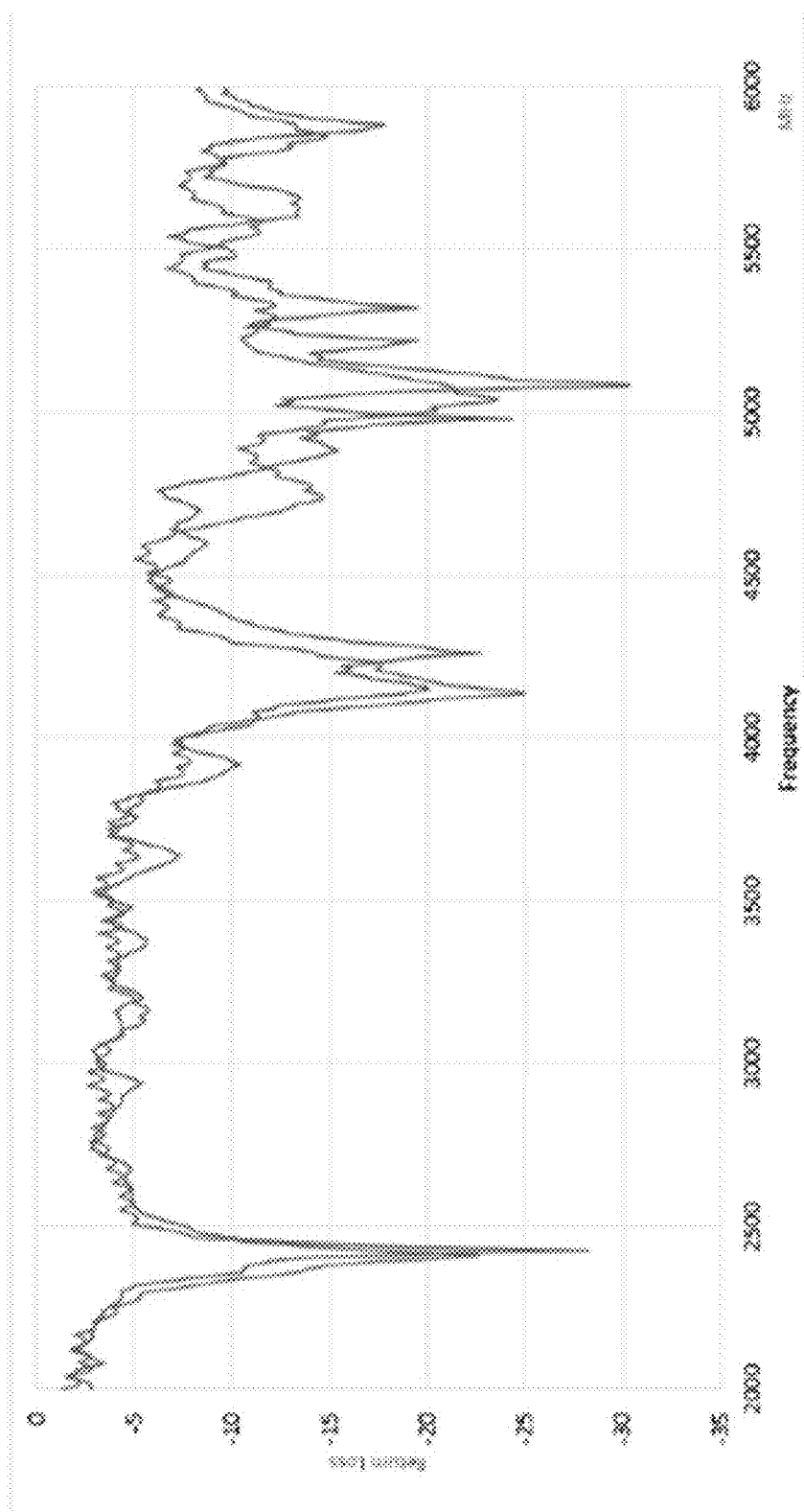
Figure 9B:
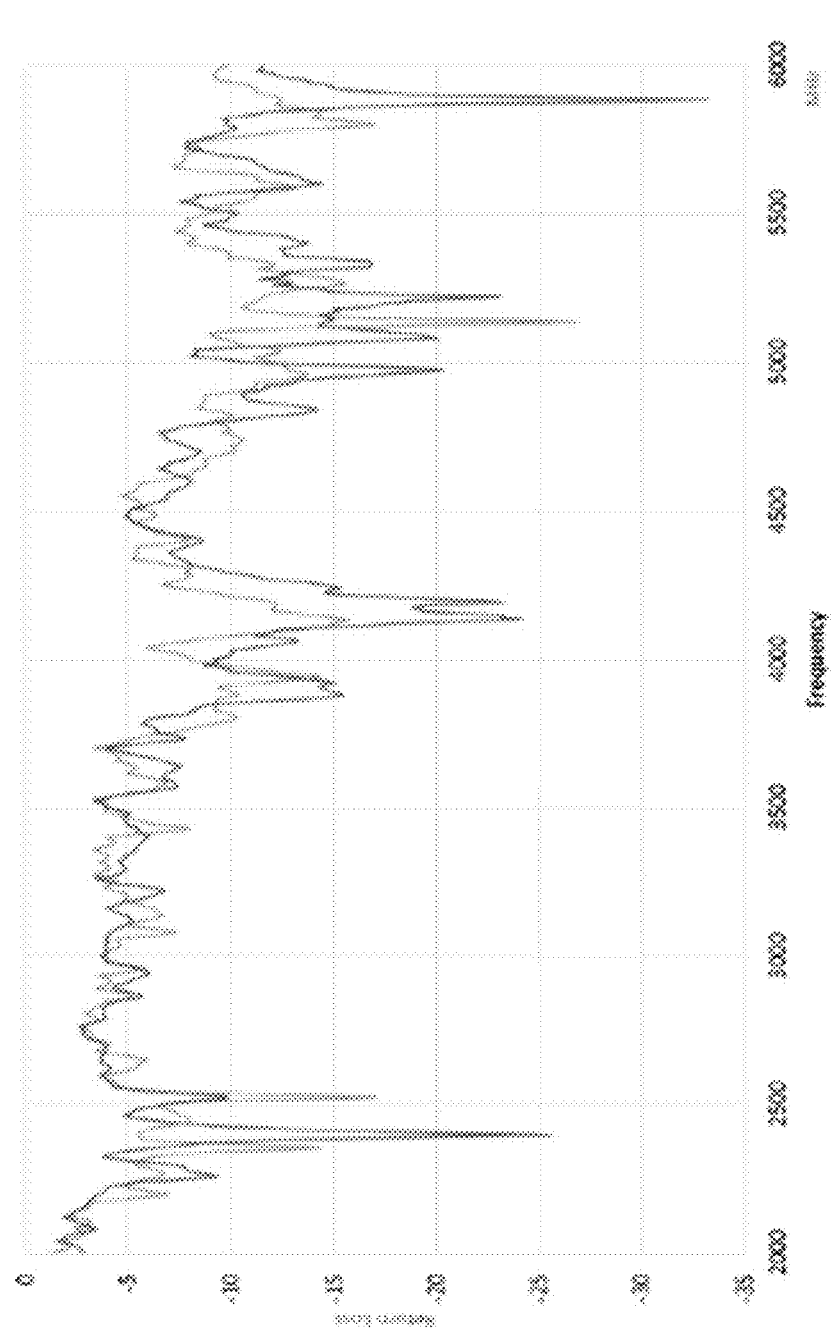

The method 700 then proceeds to block 706 where the feed structure(s) in the hinge barrel antenna system are activated. In an embodiment, either of the feed structures 320 and 322 may be activated by the wireless communication engine 210 in order to wirelessly communicate (i.e., send or receive) information. As discussed above, in response to the activation of the signal generation component on the feed structures 320, 322, the corresponding antenna system slot 312, 314 will emit radio signals at a predetermined frequency that is based upon the signal generation component and/or the dimensions of the antenna system slot. FIG. 8b illustrates a chart of return loss (on the Y-axis) vs. radio frequency when the computing device 200 is in the first orientation A and, as can be seen, the return loss is low in the 2.4 GHz frequency range as well as the 5.0 GHz frequency range. FIG. 9b illustrates a chart of return loss (on the Y-axis) vs. radio frequency when the computing device 200 is in the second orientation B and, as can be seen, the return loss is low in the 2.4 GHz frequency range as well as the 5.0 GHz frequency range. As such, the wireless communication engine 210 is enabled to wirelessly communicate using the antenna systems provided by the combination of each feed structure and the antenna system slot(s) located adjacent that feed structure and defined in the hinge barrel support member.

Figure 10:
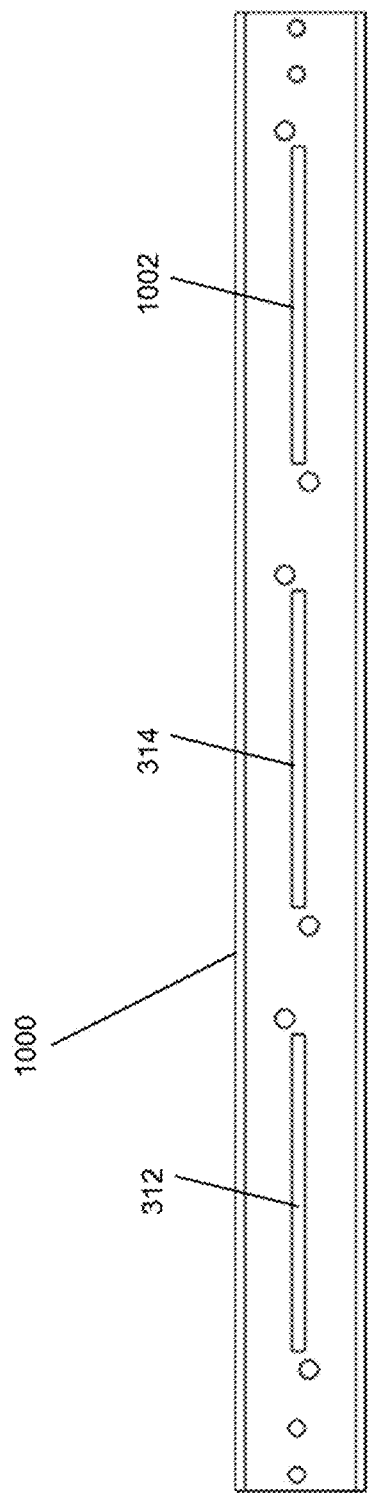
FIG. 10 is a front view illustrating an alternative embodiment of the hinge barrel support member of FIG. 3c.

Referring now to FIG. 10, an embodiment of an alternative hinge barrel support member 1000 is illustrated that is substantially similar to the hinge barrel support member 308 discussed above with reference to FIGS. 3a-3e, but with the provisioning of a third antenna system slot 1002 in addition to the first antenna system slot 312 and the second antenna system slot 314. Similarly as with the first antenna system slot 312 and the second antenna system slot 314 discussed above, the third antenna system slot 1002 may be "tuned" with respect to the signal generation component on the circuit board of its corresponding feed structure such that the activation of that signal generation component will cause the combined feed structure and antenna system slots to emit radio signals in a predetermined frequency range. As such, FIG. 10 illustrates an embodiment of a three antenna system (e.g., a Wireless Local Area Network (WLAN) 3×3 antenna system) provided for the hinge barrel antenna system of the present disclosure. One of skill in the art in possession of the present disclosure will recognize that while the antenna system slots are illustrated as substantially rectangular, different sizes and shapes of the antenna system slots may be provided depending on the desired frequency bands, mechanical environment, and/or other factors that may affect wireless transmissions using the hinge barrel antenna system.

Thus, systems and methods have been described that provide antenna system(s) in a hinge barrel using the structural support member in that hinge barrel by defining slots in that structural support member having dimensions that are "tuned" to a feed structure in order to emit radio signals in a desired frequency range when the feed structure is activated. As a result, an optimized position for the antenna systems is realized without conventionally associated interference, along with cost savings associated with the combination of an existing structural component with a portion of a radio device that utilizes slots in that structural component as an antenna that previously required a dedicated antenna component.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A hinge barrel antenna system, comprising:
    a first hinge device;
    a hinge barrel extending from the first hinge device;
    a hinge barrel support member that extends through the hinge barrel and engages the first hinge device to provide mechanical strength for the hinge barrel;
    a first slot that is defined in the hinge barrel support member and that extends through the hinge barrel support member; and
    a feed structure coupled to the hinge barrel support member adjacent the first slot, wherein the first slot is dimensioned such that the combination of the first slot and the feed structure emit radio waves having a first predetermined frequency when the feed structure is activated.

2. The hinge barrel antenna system of claim 1, further comprising:
    a second hinge device, wherein the hinge barrel extends through the hinge barrel and between the first hinge device and the second hinge device to provide mechanical strength for the hinge barrel.

3. The hinge barrel antenna system of claim 1, further comprising:
    a hinge barrel cover included on the hinge barrel and housing the hinge barrel support member, wherein the hinge barrel cover and the first slot are configured such that a specific absorption rate that is lower than a predetermined rate is produced when the feed structure is activated.

4. The hinge barrel antenna system of claim 1, further comprising:
    a circuit board including the feed structure and mounted to the hinge barrel support member to couple the feed structure to the hinge barrel support member adjacent the first slot.

5. The hinge barrel antenna system of claim 1, further comprising:
    a second slot that is defined in the hinge barrel support member adjacent the feed structure and that extends through the hinge barrel support member, wherein the second slot is dimensioned such that the combination of the second slot and the feed structure emit radio waves having a second predetermined frequency that is different than the first predetermined frequency when the feed structure is activated.

6. The hinge barrel antenna system of claim 1, further comprising:
    a radio cable coupled to the feed structure and extending through at least a portion of the hinge barrel.

7. An information handling system (IHS), comprising:
    a chassis base that houses a wireless communication engine;
    a display device that is coupled to the chassis base by a first hinge device;
    a hinge support member that extends from the first hinge device to provide mechanical strength for a hinge barrel that is located adjacent an edge of each of the chassis base and the display device;
    a first slot that is defined in the hinge support member and that extends through the hinge support member; and
    a feed structure that is coupled to the wireless communication engine and positioned adjacent the first slot, wherein the first slot is dimensioned such that the combination of the first slot and the feed structure emit radio waves having a first predetermined frequency when the feed structure is activated by the wireless communication engine.

8. The IHS of claim 7, further comprising:
    a second hinge device, wherein the hinge support member extends between the first hinge device and the second hinge device to provide mechanical strength for the hinge barrel that is located adjacent the edge of each of the chassis base and the display device.

9. The IHS of claim 7, further comprising:
    a hinge cover housing the hinge support member, wherein the hinge cover and the first slot are configured such that a specific absorption rate that is lower than a predetermined rate is produced when the feed structure is activated.

10. The IHS of claim 7, further comprising:
    a circuit board including the feed structure and mounted to the hinge support member to couple the feed structure to the hinge support member adjacent the first slot.

11. The IHS of claim 7, further comprising:
    a second slot that is defined in the hinge support member adjacent the feed structure and that extends through the hinge support member, wherein the second slot is dimensioned such that the combination of the second slot and the feed structure emit radio waves having a second predetermined frequency that is different than the first predetermined frequency when the feed structure is activated.

12. The IHS of claim 7, further comprising:
    a radio cable coupled to the feed structure and extending through at least a portion of the hinge support member and the first hinge device.

13. The IHS of claim 7, wherein the first hinge device is configured to orient the chassis base and the display device in each of a laptop/notebook orientation and a tablet orientation, and wherein neither of the chassis base and the display device are located immediately adjacent the first slot in either of the laptop/notebook orientation and the tablet orientation.

14. A method for wireless communication, comprising:
    providing a chassis base coupled to a display device by a hinge system that includes a hinge support member that defines a first slot and that extends from a first hinge device in the hinge system to provide mechanical strength for the hinge system;
    orienting the chassis base relative to the display device into one of a first orientation and a second orientation using the hinge system, wherein neither of the chassis base and the display device are located immediately adjacent the first slot in either of the first orientation and the second orientation;
    activating a feed structure that is included in the hinge system adjacent the first slot; and emitting radio waves having a first predetermined frequency in response to the activation of the feed structure, wherein the first predetermined frequency is determined, at least in part, by dimensions of the first slot.

15. The method of claim 14, wherein the hinge support member extends between the first hinge device and a second hinge device that are included on the hinge system to provide mechanical strength for the hinge system.

16. The method of claim 14, wherein the hinge cover and the first slot are configured such that a specific absorption rate that is lower than a predetermined rate is produced when the feed structure is activated.

17. The method of claim 14, wherein a circuit board including the feed structure is mounted to the hinge support member to couple the feed structure to the hinge support member adjacent the first slot.

18. The method of claim 14, wherein a second slot is defined in the hinge support member adjacent the feed structure, and wherein radio waves having a second predetermined frequency that is different than the first predetermined frequency are emitted when the feed structure is activated, and wherein the second predetermined frequency is determined, at least in part, by dimensions of the second slot.

19. The method of claim 14, wherein the feed structure is activated by a wireless communication engine in the chassis base through a cable that extends through at least a portion of the hinge system.

20. The method of claim 14, wherein the first orientation is a laptop/notebook orientation and the second orientation is a tablet orientation.

* * * * *